United States Patent [19]

Fukumoto

[11] Patent Number: 5,779,482
[45] Date of Patent: Jul. 14, 1998

[54] INDICATIONS FOR THE VISUALLY HANDICAPPED USING TRANSPARENT THREE-DIMENSIONAL INK

[75] Inventor: Masayuki Fukumoto, Tokyo, Japan

[73] Assignees: Yuugenkaisha Mediamews, Tokyo; Kabushikikaisha Sanichi-Kougeisha, Matsudo, both of Japan

[21] Appl. No.: 801,515

[22] Filed: Feb. 18, 1997

Related U.S. Application Data

[63] Continuation-in-part of Ser. No. 371,163, Jan. 11, 1995, abandoned.

[30] Foreign Application Priority Data

| Jan. 12, 1994 | [JP] | Japan | 6-001055 U |
| Feb. 8, 1994 | [JP] | Japan | 6-002307 U |
| Feb. 28, 1994 | [JP] | Japan | 6-003460 U |

[51] Int. Cl.$^6$ ............................................. G09B 21/00
[52] U.S. Cl. ............................................. 434/113; 206/459.5
[58] Field of Search ........................ 434/112, 113; 206/459.5

[56] References Cited

U.S. PATENT DOCUMENTS

| 3,882,167 | 5/1975 | Klupfel et al. | 260/486 R |
| 3,924,019 | 12/1975 | Jacob | 427/14 |
| 4,404,764 | 9/1983 | Wills et al. | 434/113 X |
| 4,650,421 | 3/1987 | Anczurowski | 434/113 |
| 5,011,032 | 4/1991 | Rollman | 215/230 |
| 5,151,212 | 9/1992 | Sokyrka | 434/113 |
| 5,240,335 | 8/1993 | Itoh et al. | 400/122 |

FOREIGN PATENT DOCUMENTS

| 2224383 | 5/1990 | United Kingdom | 434/113 |
| 2263269 | 7/1993 | United Kingdom | 434/113 |

*Primary Examiner*—Jeffrey A. Smith
*Attorney, Agent, or Firm*—Burgess, Ryan & Wayne

[57] ABSTRACT

Disclosed is an indication for the visually handicapped using transparent three-dimensional ink, wherein a letter and/or a design is formed using the transparent three-dimensional ink on the indication on which an usual letter and/or design for the healthy persons is indicated, such as printed matter in which braille points of the same sound are formed using the transparent three-dimensional ink on the printed matter on which letters are printed with ordinary ink, a package of a label of a goods in which necessary information such as a trade name and contents thereof is expressed by braille points using the transparent three-dimensional ink on a surface of the package or the label on which a design or letters are printed, or printed matter in which necessary information such as a design is formed using the transparent three-dimensional ink on the printed matter on which a design is printed.

7 Claims, 3 Drawing Sheets

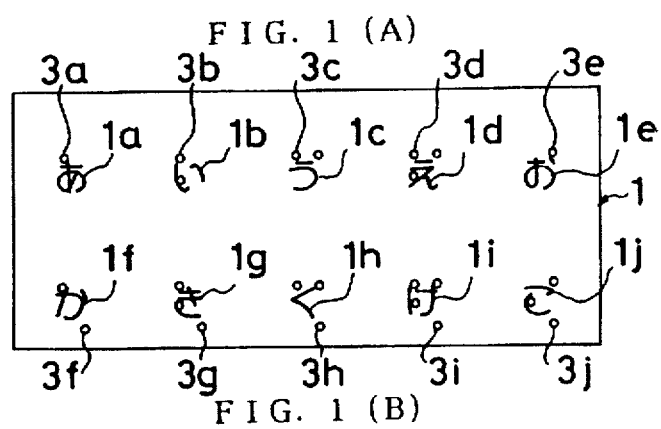
FIG. 1 (A)
FIG. 1 (B)
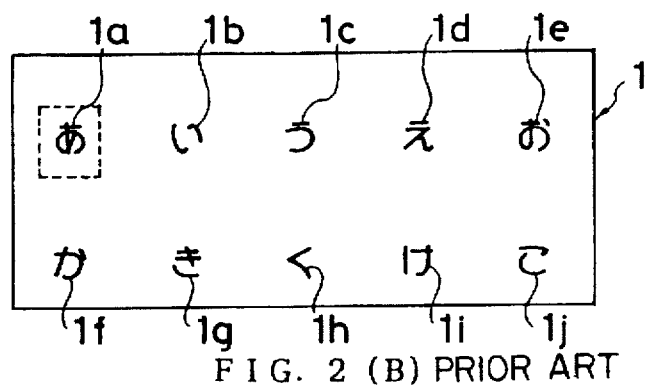
FIG. 2 (A) PRIOR ART
FIG. 2 (B) PRIOR ART
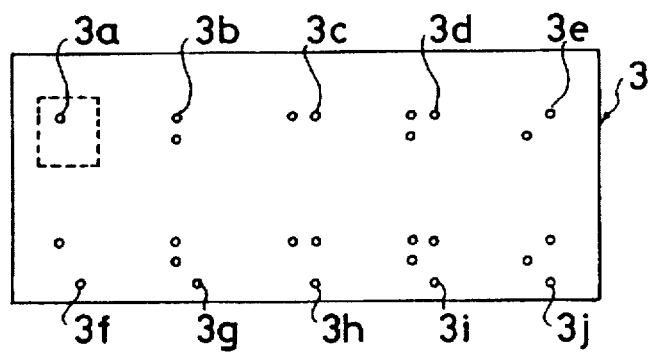
FIG. 3 (A) PRIOR ART
FIG. 3 (B) PRIOR ART

PRIOR ART

PRIOR ART

INDICATIONS FOR THE VISUALLY HANDICAPPED USING TRANSPARENT THREE-DIMENSIONAL INK

This application is a continuation-in-part of application Ser. No. 08/371,163, filed Jan. 11, 1995 (now abandoned).

BACKGROUND OF THE INVENTION

1) Field of the Invention

The present invention relates to indications for the visually handicapped using transparent three-dimensional ink.

2) Background Art

Of the prior-art indications for the visually handicapped, for example, the braille printed matter indications have been produced by stamping or braille typing only for the visually handicapped.

It is therefore impossible for the healthy persons to learn the braille points simply by oneself. In general, it becomes necessary to attend braille classes sponsored by social welfare organizations or self-governing bodies, or to receive correspondence lessons in braille points. The braille points are a respectable language. Accordingly, if there is a method by which the healthy persons can understand the braille points more than they used to, the exchange between the healthy persons and the visually handicapped is expected to be activated.

Further, of the indications for the visually handicapped, the packages of the labels are made for the healthy persons. The visually handicapped can not therefore understand contents thereof in advance by oneself. Furthermore, when the braille points are indicated in spaces of the packages or the labels, treatment such as stamping or braille typing is required, which possibly damages designs of the packages or the labels themselves.

Accordingly, when the visually handicapped purchase daily necessaries always used, they must be helped by the healthy persons. Also after purchase, sticking of braille seals on the purchased goods is required to use them smoothly. Further, when the manufacturers grapple with this problem with effort, they can not choose but add the braille points to the packages or the labels which are said to be "faces of goods", thereby changing designs thereof, or additionally indicating the braille points in blank spaces thereof.

Conventional braille points are usually formed of thermosetting ink. Braille points obtained by using thermosetting ink only have a height of about 100 μm. Accordingly, the rate of recognition by the visually handicapped is as low as less than 50%. The conventional braille points are also inferior in transparency. In addition, they can not easily be formed on a substrate such as paper or a plastic sheet, because such a substrate can be damaged by heat in heat hardening treatment.

Furthermore, designs for the visually handicapped indicated on printed matter are formed with three-dimensional ink in which foamed ink is colored, or by the blind stamping technique. The designs for the visually handicapped printed on the printed matter are thus composed of lines alone using three-dimensional ink, forming the printed matter exclusively for the visually handicapped. In addition, this printed matter is colored in lines alone even if it is colored, and the face thereof is left uncolored as a white ground, in many cases.

SUMMARY OF THE INVENTION

An object of the present invention is to provide an indication for the visually handicapped indicated on a printed medium through which both the healthy persons and the visually handicapped can have communication with each other.

Another object of the present invention is to provide an indication for the visually handicapped which makes it possible for the visually handicapped to select goods by oneself and to easily distinguish them from similar packages and cases of goods in everyday life.

It is a further object of the present invention to provide an indication for the visually handicapped which can be utilized for a picture for painting for the visually handicapped, using an ordinary printed design, and which is useful as a supplemental tool for the concepts of the color and the shape for the visually handicapped.

According to the present invention, there is provided an indication for the visually handicapped using transparent three-dimensional ink which is characterized in that a letter and/or a design is formed using the transparent three-dimensional ink on the indication on which an usual letter and/or design for the healthy persons is indicated.

BRIEF DESCRIPTION OF THE DRAWINGS

FIG. 1 (A) is a plan view showing a first embodiment of an indication for the visually handicapped using transparent three-dimensional ink of the present invention, wherein braille points of the same sound are formed using the transparent three-dimensional ink on printed matter on which letters are printed, and FIG. 1 (B) is a side elevational view thereof;

FIG. 2 (A) is a plan view showing prior-art printed matter on which letters are printed, and FIG. 2 (B) is a side elevational view thereof;

FIG. 3 (A) is a plan view showing prior-art braille printed matter, and FIG. 3 (B) is a side elevational view thereof;

DETAILED DESCRIPTION OF THE PREFERRED EMBODIMENTS

Figure 4:
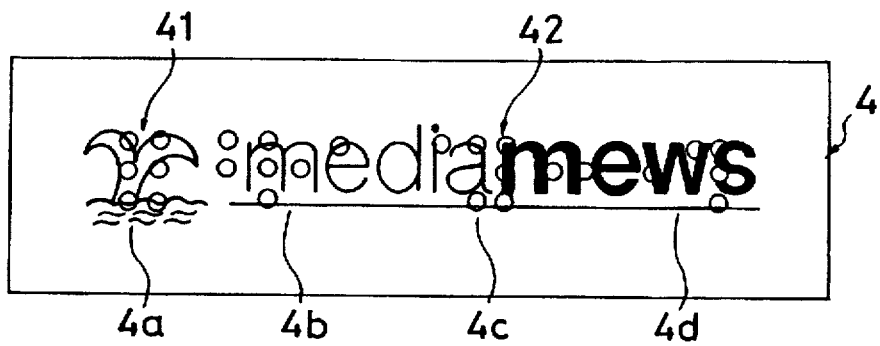
FIG. 4 (A) is a plan view showing a second embodiment of an indication for the visually handicapped using transparent three-dimensional ink of the present invention, wherein necessary information is formed as braille points using the transparent three-dimensional ink on a package or a label of goods on which a design and letters are printed, and FIG. 4 (B) is a side elevational view thereof.
Figure 4:

A first embodiment of the present invention, a braille indication using transparent three-dimensional ink, is illustrated with reference to FIGS. 1 to 3.

FIG. 2A and 2B show prior-art printed matter on which letters are printed by ordinary ink. Japanese letters あ(1a), い(1b), う(1c), え(1d), お(1e), か(1f), き(1g), く(1h), け(1i) and, こ(1j) are printed on a substrate 1 such as paper printable with ink. The healthy persons can read the letters, but the visually handicapped can not understand them.

Further, FIG. 3A and 3B prior-art braille printed matter. Braille points 3a, 3b, 3c, 3d, 3e, 3f, 3g, 3h, 3i and 3j corresponding to Japanese letters あいうえおかきくけ and こ respectively, are formed with transparent three-dimensional ink on a substrate 3 such as paper. The visually handicapped can read the braille points, but the healthy persons can not understand them.

In the first embodiment of the present invention, as shown in FIGS. 1A and 1B, Japanese letters あ(1a), い(1b), う(1c), え(1d), お(1e), か(1f), き(1g), く(1h), け(1i) and こ(1j) are printed on a substrate 1 such as paper printable with ink, and braille points 3a, 3b, 3c, 3d, 3e, 3f, 3g, 3h, 3i and 3j corresponding thereto are formed on portions corresponding to the respective Japanese letters.

Thus, according to the braille printed matter of the first embodiment, both the healthy persons and the visually handicapped can understand the letters described on the printed matter.

Here, the letters mean Chinese characters, "hiragana" (Japanese cursive syllabaries), "katakana" (Japanese square syllabaries), numerals, alphabets, symbols, etc. Further, the transparent three-dimensional ink is ink through which ground letters or colors printed on the printed matter can pass as such without failure.

Materials for the transparent three-dimensional ink include, for example, thermoplastic resin powders, foamed ink expandable by heating and photo-curing ink hardenable by ultraviolet radiation. The photo-curing ink is particularly preferred among others, in terms of excellent heat resistance and abrasion resistance, good adhesion to substrate layers constituting the indications, hardenability at about 40° C. and no damages to materials such as the substrate layers.

In contrast to braille points formed by the conventional process, the braille points of the present invention formed of photo-curing ink hardenable by ultraviolet radiation have a height of from about 300 μm to about 500 μm, so that the rate of recognition by the visually handicapped reaches approximately 100%. The braille points of the invention are also superior in transparency. Further, they can be formed on any substrate including paper and a plastic sheet, because no heat is used in hardening treatment.

Examples of the transparent three-dimensional ink include photo-curing acrylic resins, epoxy resins, urethane resins and unsaturated polyester resins. The transparent three-dimensional ink may contain various kinds of pigments and dyes to color it, as long as transparency thereof is not impaired.

According to the first embodiment, the healthy persons can understand the letters as usual printed matter, and the visually handicapped can also understand the letters as conventional braille printed matter.

Accordingly, both the healthy persons and the visually handicapped can have communication with each other through this printed matter. Further, for example, Japanese letter あ is overlapped with the corresponding braille points of the same sound, so that the healthy persons can very easily learn the braille without a master. This also results in that a visually handicapped child and a healthy child can have a conversation with each other through a picture book.

Like this, the first embodiment is greatly helpful in contributing to welfare.

In the first embodiment, each letter printed on the printed matter is overlapped with the braille points of the same sound using the transparent three-dimensional ink, but the present invention is not limited thereto.

For example, a design printed on the printed matter may be overlapped with braille points having the same meaning as the design, using the transparent three-dimensional ink. Further, the braille points using the transparent three-dimensional ink may be different in their meanings from the letters and/or designs indicated on the printed matter, and they may be, for example, necessary information for these letters and/or designs.

Furthermore, in the first embodiment, paper is illustrated as the material of the substrate 1, but the material is not limited thereto. Examples of the materials which can be employed include plastics, metals and ceramics. The substrate may have not only a sheet-like form represented by paper, but also a three-dimensional form.

Then, a second embodiment of the present invention, a braille indication using transparent three-dimensional ink, is illustrated with reference to FIGS. 4 to 6.

Figure 5:
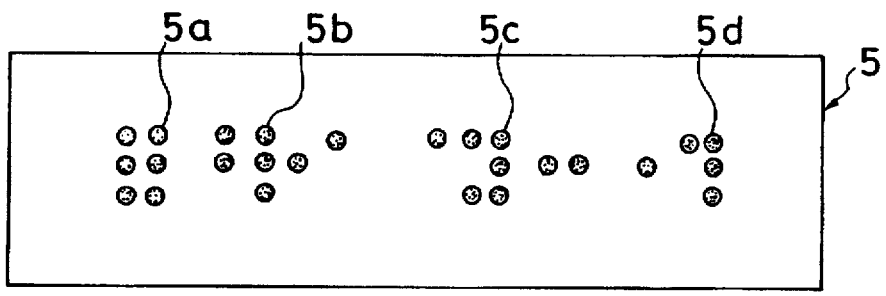
FIG. 5 is a plan view showing a prior-art package or label of goods containing necessary information.

FIG. 5 shows a prior-art braille package or label of goods. Braille points 5a, 5b, 5c and 5d corresponding to necessary information are formed with transparent three-dimensional ink on a substrate 5 of the package or the label. The visually handicapped can read the braille points, but the healthy persons can not understand them.

Moreover, the conventional braille points shown in FIG. 5 have a low height of at most about 100 μm, so that they feel flat. It is therefore not easy for the visually handicapped to clearly distinguish them. In addition, these braille points are poor in transparency.

Figure 6:
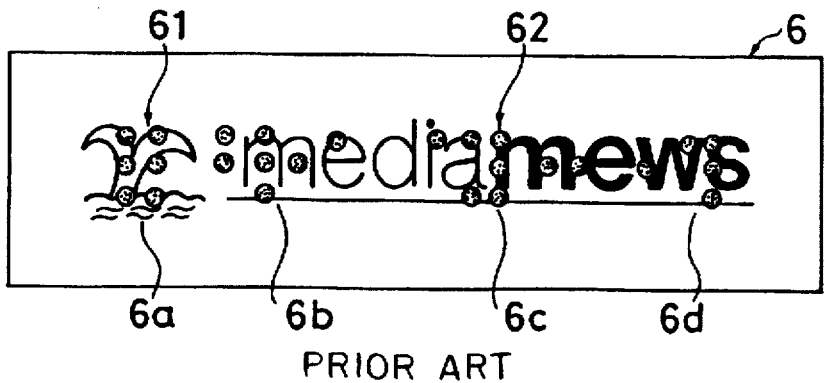
FIG. 6 is a plan view showing a prior-art package or label of goods, wherein necessary information is stamped as braille points on the package or the label on which a design and letters are printed.

Further, FIG. 6 shows a prior-art package or label of goods. A design 61 and letters 62 are printed on a substrate 6 of the package or the label, and braille points 6a, 6b, 6c and 6d resulting necessary information are formed by stamping in positions approximately corresponding to the design and the letters. In the prior-art package or label, the braille points are formed by stamping, so that the design and the letters printed on the substrate of the package or the label are disturbed in their expression by the braille points stamped.

In the second embodiment of the present invention, as shown in FIG. 4, a design 41 and letters 42 are printed on a substrate 4 of a package or a label of goods, and braille points 4a, 4b, 4c and 4d resulting necessary information are formed using transparent three-dimensional ink in positions approximately corresponding to the design and the letters.

Here, the information is information such as the name of the good or the description of the contents thereof associated with the package or the label, and the braille points may have the same meanings as the design and the letters, or may be different therefrom in their meanings.

According to the second embodiment, it becomes possible for the visually handicapped to select the goods by oneself and to easily distinguish it from similar packages and cases of goods in everyday life.

Further, the manufacturers can give information for the package or the label of the good to the consumers without changing the package or the label which have hitherto been used.

The manufacturers can therefore include the visually handicapped as consumers, which makes it possible to enlarge the market. Further, the braille points can share a restricted space of a container with the printed design and letters. It is therefore possible to give information to some extent even through a small container. Furthermore, the use of transparent three-dimensional ink causes no necessity of changes in the design of the package or the label which has hitherto been used.

The other structures, functions and effects of the second embodiment are similar to those of the first embodiment, and therefore, descriptions thereof are omitted.

Then, a third embodiment of the present invention, a braille indication using transparent three-dimensional ink, is illustrated with reference to FIGS. 7 and 8.

Figure 8:
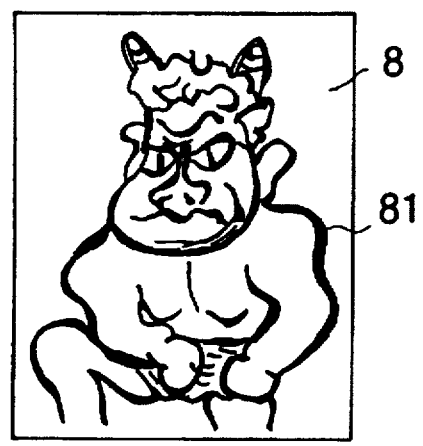
FIG. 8 (A) is a plan view showing prior-art usual printed matter for the healthy persons on which a design is printed, and FIG. 8 (B) is a plan view showing prior-art printed matter for the visually handicapped on which a design is printed using transparent three-dimensional ink.
Figure 8:
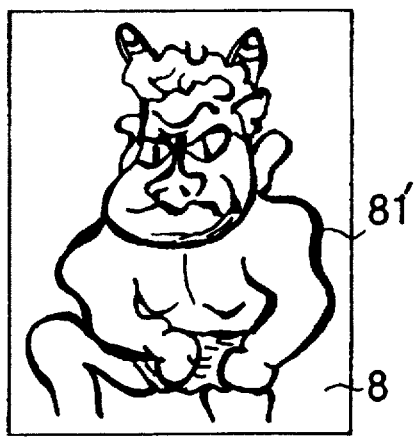

FIG. 8 (A) shows a printed matter on which a conventional ordinary design is printed with ordinary ink. An ordinary design 81 is printed on a substrate 8 forming a plate. The healthy persons can understand this design, but the visually handicapped can not understand it. On the other hand, FIG. 8 (B) shows conventional printed matter for the visually handicapped. A design 81' (information intended to be given to the visually handicapped) is formed on the substrate 8 using transparent three-dimensional ink. The visually handicapped can understand this design, but this is insufficient for the healthy persons as a design.

Figure 7:
FIG. 7 (A) is a plan view showing a third embodiment of an indication for the visually handicapped using transparent three-dimensional ink of the present invention, wherein a design for the healthy persons is identical with and overlapped with that for the visually handicapped, and FIG. 7 (B) is a plan view showing an indication, wherein a design for the healthy persons is different from that for the visually handicapped.
Figure 7:

In the third embodiment of the present invention, as shown in FIG. 7 (A), a design 71 is printed on a substrate 7 forming a plate with ordinary ink, and a design 71' (information intended to be given to the visually handicapped) having the same meaning as the design 71 is formed thereon using transparent three-dimensional ink. The designs overlapped with each other provide the same information. Accordingly, both the healthy persons and the visually handicapped can understand the design formed on the substrate 7.

Further, FIG. 7 (B) of the third embodiment is the same as FIG. 7 (A) with the exception that the ordinary design 71 for the healthy persons is different from the design 71' (information intended to be given to the visually handicapped) for the visually handicapped and the designs overlapped with each other provide different information.

According to the third embodiment, the healthy persons can recognize the design or color on a ground as such, and the visually handicapped, particularly the amblyopic persons, can recognize them under the guidance of the transparent three-dimensional ink. The completely blind persons can recognize the shape by using the transparent three-dimensional ink as a guideline.

Like this, according to the third embodiment, it becomes possible for both the healthy persons and the visually handicapped to have communication with each other, and it can be useful as a supplemental tool for the color and the shape for the visually handicapped. In addition, it can be utilized as a picture for painting for the visually handicapped, using an ordinary printed design.

The other structures, functions and effects of the third embodiment are similar to those of the first embodiment, and therefore, descriptions thereof are omitted.

What is claimed is:

1. An indication for the visually handicapped using transparent three-dimensional ink having a height of from about 300 µm to about 500 µm and which has been cured by ultraviolet radiation, wherein at least one marking is formed on a substrate and wherein at least a first portion of the at least one marking is formed using the transparent three-dimensional ink and wherein at least a second portion of the at least one marking is visually observable to healthy persons.

2. The indication according to claim 1, wherein said indication is printed matter.

3. The indication according to claim 2, wherein the first portion of the at least one marking formed using the transparent three-dimensional ink has the same meaning as the second portion of the at least one marking visually observable to healthy persons.

4. The indication according to claim 2, wherein the first portion of the at least one marking formed using the transparent three-dimensional ink is different in its meaning from the second portion of the at least one marking visually observable to healthy persons.

5. A package of goods for the visually handicapped using transparent three-dimensional ink having a height of from about 300 µm to 500 µm, and which has been cured by ultraviolet radiation, the package of goods including a substrate wherein at least one marking is formed on said substrate and wherein at least a first portion of the at least one marking is formed using the transparent three-dimensional ink and at least a second portion of the at least one marking is visually observable to healthy persons.

6. The package according to claim 5, wherein the first portion of the at least one marking formed using the transparent three-dimensional ink has the same meaning as the second portion of the at least one marking visually observable to healthy persons.

7. The package according to claim 5, wherein the first portion of the at least one marking formed using the transparent three-dimensional ink is necessary information for the goods which is different in its meaning from the second portion of the at least one marking visually observable to healthy persons.

* * * * *